US012511757B2

(12) United States Patent
Thamm et al.

(10) Patent No.: US 12,511,757 B2
(45) Date of Patent: Dec. 30, 2025

(54) COMPUTER-IMPLEMENTED SEGMENTATION AND TRAINING METHOD IN COMPUTED TOMOGRAPHY PERFUSION, SEGMENTATION AND TRAINING SYSTEM, COMPUTER PROGRAM AND ELECTRONICALLY READABLE STORAGE MEDIUM

(71) Applicant: Siemens Healthineers AG, Forchheim (DE)

(72) Inventors: Florian Thamm, Fuerth (DE); Markus Juergens, Adelsdorf (DE)

(73) Assignee: Siemens Healthineers AG, Forchheim (DE)

( * ) Notice: Subject to any disclaimer, the term of this patent is extended or adjusted under 35 U.S.C. 154(b) by 404 days.

(21) Appl. No.: 17/843,297

(22) Filed: Jun. 17, 2022

(65) Prior Publication Data

US 2022/0405941 A1 Dec. 22, 2022

(30) Foreign Application Priority Data

Jun. 22, 2021 (EP) .................................... 21180950

(51) Int. Cl.
*G06T 7/136* (2017.01)
*A61B 6/00* (2024.01)
(Continued)

(52) U.S. Cl.
CPC .............. *G06T 7/136* (2017.01); *A61B 6/507* (2013.01); *G06T 7/11* (2017.01); *G06T 11/008* (2013.01);
(Continued)

(58) Field of Classification Search
CPC ......... G06T 7/136; G06T 7/11; G06T 11/008; G06T 2207/10076; G06T 2207/20081;
(Continued)

(56) References Cited

U.S. PATENT DOCUMENTS

2018/0374213 A1* 12/2018 Arnold .................. G06N 5/046
2019/0150764 A1* 5/2019 Arnold .................. G06V 10/82
(Continued)

OTHER PUBLICATIONS

Robben, David, et al. "Prediction of final infarct vol. from native CT perfusion and treatment parameters using deep learning." Medical image analysis 59 (2020): 101589. (Year: 2020).*
(Continued)

*Primary Examiner* — Oneal R Mistry
*Assistant Examiner* — Jongbong Nah
(74) *Attorney, Agent, or Firm* — Harness, Dickey & Pierce, P.L.C.

(57) ABSTRACT

A computer-implemented segmentation method for segmenting a core and a penumbra in a four-dimensional computed tomography perfusion dataset of ischemic tissue in an image region of a patient, includes determining at least one parameter map for at least one perfusion parameter from the computed tomography perfusion dataset; and using the at least one parameter map and the computed tomograph perfusion dataset as input data to a trained function to determine output data, the output data including segmentation information of the penumbra and the core.

20 Claims, 7 Drawing Sheets

(51) Int. Cl.
- A61B 6/50 (2024.01)
- G06T 7/11 (2017.01)
- G06T 11/00 (2006.01)
- G06V 10/77 (2022.01)
- G16H 30/40 (2018.01)

(52) U.S. Cl.
CPC ......... *G06V 10/7715* (2022.01); *G16H 30/40* (2018.01); *G06T 2207/10076* (2013.01); *G06T 2207/20081* (2013.01); *G06T 2207/30104* (2013.01)

(58) Field of Classification Search
CPC . G06T 2207/30104; G06T 2207/10081; G06T 2207/20084; G06T 2207/30016; G06T 7/10; A61B 6/507; G06V 10/7715; G16H 30/40

See application file for complete search history.

(56) References Cited

U.S. PATENT DOCUMENTS

| | | | | |
|---|---|---|---|---|
| 2021/0019882 | A1* | 1/2021 | Hofmann | G16H 30/20 |
| 2021/0097322 | A1* | 4/2021 | Mueller | A61B 6/504 |
| 2022/0058798 | A1* | 2/2022 | Rubin | G06N 3/088 |
| 2022/0087631 | A1* | 3/2022 | d'Esterre | A61B 6/507 |
| 2022/0114726 | A1* | 4/2022 | Amukotuwa | G06T 7/0012 |

OTHER PUBLICATIONS

Bohme Lasse et al: "Combining Good Old Random Forest and DeepLabv3+ for ISLES 2018 CT-Based Stroke Segmentation", (Jan. 26, 2019), Advances in Databases and Information Systems; pp. 335-342 (Year: 2019).*

Bammer et al; al „MR and CT perfusion and pharmacokinetic imaging: clinical applications and theoretical principles; Coversheet + p. 573 to 577.

Xiaojun, H. et al.: "StrokeNet: 3D Local Refinement Network for Ischemic Stroke Lesion Segmentation", 2018.

Thamm, F. : "Ischemic Stroke Segmentation on CT-Perfusion Data using Deep Learning Methods", Master Thesis, 2019.

Wang, G. et al.:"Automatic Ischemic Stroke Lesion Segmentation from Computed Tomography Perfusion Images by Image Synthesis and Attention-Based Deep Neural Networks", in: arXiv:2007. 03294, 2020.

David Robben et al: "Prediction of final 5-8, 13 infarct volume from native CT perfusion and treatment parameters using deep learning"; arxiv.org, Cornell University Library, 201 Olin Library Cornell University Ithaca, NY 14853; Dec. 6, 2018 (Dec. 6, 2018); XP080989855.

Chen, C. et al.:"Thresholds for infarction vary between gray matter and white matter in acute ischemic stroke: A CT perfusion study", in: J Cereb Blood Flow Metab. Mar. 2019;39(3):536-546. doi: 10.1177/0271678X17744453. Epub Nov. 27, 2017.

Turowski B et al:"An Appeal to Standardize CT- and MR-Perfusion", Clinical Neuroradiology; Springer Berlin Heidelberg, Berlin/Heidelberg; vol. 25, No. 2; Aug. 20, 2015 (Aug. 20, 2015); pp. 205-210; XP035539016; ISSN: 1869-1439; DOI: 10.1007/S00062-015-0444-5 [retrieved on Aug. 20, 2015].

Pengbo, L.:"Stroke Lesion Segmentation with 2D Convolutional Neutral Network and Novel Loss Function", In book: Brainlesion: Glioma, Multiple Sclerosis, Stroke and Traumatic Brain Injuries (pp. 253-262) (Abstract) 2019.

Lucas, C. et al.:"Learning to Predict Ischemic Stroke Growth on Acute CT Perfusion Data by Interpolating Low-Dimensional Shape Representations", in: Front. Neurol., Nov. 26, 2018 | https://doi.org/10.3389/fneur.2018.00989.

Young Joseph Yeen et al: "Acute ischemic 1-15 stroke imaging: a practical approach for diagnosis and triage"; International Journal of Cardiovascular Imaging, Kluwer Academic Publishers, Dordrecht, NL; vol. 32, No. 1; Sep. 11, 2015 (Sep. 11, 2015); pp. 19-33; XP035824582; ISSN: 1569-5794; DOI: 10.1007/S10554-015-0757-0 [retrieved on Sep. 11, 2015].

Song, T.:"Generative Model-Based Ischemic Stroke Lesion Segmentation", arXiv:1906.02392v1, 2019.

Bivard, A. et al.: "Perfusion computer tomography: imaging and clinical validation in acute ischaemic stroke", in: Brain 2011: 134; 3408-3416.

Longting, L. et al.: "Whole brain ct perfusion to quantify acute ischemic penumbra and core", in: Radiology, 279(3):876-887, 2016.

Dolz, J. et al.: "Dense Multi-Path U-Net for Ischemic Stroke Lesion Segmentation in Multiple Image Modalities", 2018.

Böhme Lasse et al: "Combining Good Old Random Forest and DeepLabv3+ for ISLES 2018 CT-Based Stroke Segmentation"; Jan. 26, 2019 (Jan. 26, 2019); Advances Indatabases and Information Systems; [Lecture Notes in Computer Science; Lect.Notes Computer]; Springer International Publishing; Cham; pp. 335-342; XP047502337; ISBN: 978-3-319-10403-4 [retrieved on Jan. 26, 2019].

Maier Oskar et al: "ISLES 2015—A public 1-15 evaluation benchmark for ischemic stroke lesion segmentation from multispectral MRI"; Medical Image Analysis; vol. 35; Jul. 21, 2016 (Jul. 21, 2016); pp. 250-269; XP029801713; ISSN: 1361-8415; DOI: 10.1016/J.MEDIA.2016.07.009.

Abels, B. et al.: "Perfusion CT in Acute Ischemic Stroke: A Qualitative and Quantitative Comparison of Deconvolution and Maximum Slope Approach", in: American Journal of Neuroradiology, 31(9):1690-1698, 2010.

Song, T. et al.:Integrated extractor, generator and segmentor for ischemic stroke lesion segmentation. In International MICCAI Brainlesion Workshop, pp. 310-318. Springer, 2018.

Campbell, B.C.V. et al.: "Cerebral blood flow is the optimal ct perfusion parameter for assessing infarct core", in: Stroke, 42(12):3435-3440, 2011.

Clèrigues, A. et al.: "Ensemble of convolutional neural networks for acute stroke anatomy differentiation", 2016.

Choudhury, Ahana Roy et al.; "Segmentation of Brain Tumors Using DeepLabv3+"; DOI https://doi.org/10.1007/978-3-030-11726-9_14; Springer, Cham; Jan. 26, 2019; XP55872528;.

* cited by examiner

COMPUTER-IMPLEMENTED SEGMENTATION AND TRAINING METHOD IN COMPUTED TOMOGRAPHY PERFUSION, SEGMENTATION AND TRAINING SYSTEM, COMPUTER PROGRAM AND ELECTRONICALLY READABLE STORAGE MEDIUM

CROSS-REFERENCE TO RELATED APPLICATION(S)

The present application hereby claims priority under 35 U.S.C. § 119 to European patent application number EP 21180950.4 filed Jun. 22, 2021, the entire contents of which are hereby incorporated herein by reference.

FIELD

Example embodiments of the present invention generally related to a computer-implemented segmentation method for segmenting a core and a penumbra in a four-dimensional computed tomography perfusion dataset of ischemic tissue in an image region of a patient, wherein at least one parameter map for at least one perfusion parameter is determined from the computed tomography perfusion dataset, whereafter a trained function using the at least one parameter map as input data determines output data comprising segmentation information of the penumbra and the core. Example embodiments of the present invention further concerns a computer-implemented training method for providing a trained function, a segmentation system, a training system, a computer program and an electronically readable storage medium.

BACKGROUND

In an acute stroke or other medically relevant condition, blood flow to the parenchyma in the brain, that is, cerebral tissue, is decreased, such that dysfunction and, in many cases, tissue death (necrosis) results. Medical examination methods have been proposed to localize stroke lesions. For acute ischemic strokes, where time is of the essence, due to its high availability and short examination times, computed tomography (CT), in particular a computed tomography perfusion (CTP) measurement, is often performed.

CTP is a functional imaging technique, in which the flow of a contrast agent through the blood vessels in an imaging region is measured. Hence, CTP datasets are four-dimensional (three spatial dimensions and time=3D+t) datasets, which are often also called cine datasets. These CTP datasets may be, as is well known in the art, evaluated to calculate perfusion parameter maps based on the contrast agent behaviour over time. For example, known perfusion parameters are cerebral blood flow (CBF), cerebral blood volume (CBV), mean transit time (MTT), time to maximum (TMAX), time to peak (TTP) and time to drain (TTD). In particular based on these parameter maps, the stroke lesion can be localized. Of particular interest is the localization, that is, in image evaluation terms, segmentation, of the core and the penumbra of the stroke lesion. While the core (core ischemic zone) is ischemic tissue which is lost and cannot be saved by any medical treatment, the penumbra is hypoperfused, that is undersupplied, ischemic tissue which is not yet dead, in other words ischemic, but still viable cerebral tissue. Penumbra is tissue at risk evolving into ischemic tissue if no reperfusion is established. See, for example, Roland Bammer, "MR and CT perfusion and pharmacokinetic imaging: clinical applications and theoretical principles", Lippincott Williams & Wilkins, 2016.

The perfusion parameters describing the blood perfusion on a pixel-basis or voxel-basis provide an insight into the delivery of blood to the brain parenchyma and enable the distinction between penumbra and the core of the critically infarcted tissue, which is of high importance regarding the decision concerning revascularization procedures, which may also be called reperfusion procedures or recanalization procedures. In the clinical workflow, the actual localization and distribution of the penumbra and core infarcted tissue plays a crucial role for the indication and consequently the chosen treatment of the patient. Exemplary treatments comprise the (intra-venous) thrombolysis (for stroke onsets less than 4.5 hours ago) and/or mechanical thrombectomy.

Regarding the segmentation of the core and the penumbra from the derived perfusion parameter maps, two main approaches are known in the art.

In a first approach, threshold segmentation is applied based on certain thresholds for at least one of the perfusion parameters of the parameter maps. However, neither a standardized definition nor an overall established opinion regarding threshold levels exists in the literature. Hence, medical practitioners tend to either use their personally most preferred threshold levels, the default setting in the respectively used software or levels determined on evidence-based studies. While one known software package uses threshold values proposed by Abels et al. in "Perfusion CT in acute ischemic stroke: a qualitative and quantitative comparison of deconvolution and maximum slope approach", American Journal of Neuroradiology 31(9):1690-1698, 2010, as default threshold values in the CTP workflows, other threshold values were recommended by Campbell et al. in "Cerebral blood flow is the optimal CT perfusion parameter for assessing infarct core", Stroke 42(12):3435-3440, 2011, or by Lin et al. in "Whole brain CT perfusion to quantify acute ischemic penumbra and core", Radiology 279(3):876-887, 2016.

In a second approach, artificial intelligence was employed. Deep learning models provide promising methods addressing the segmentation of the core and the penumbra. Most of the published works focus on the core prediction rather than including the penumbra as well.

For example, the MICCAI ISLES 2018 challenge gave rise to many of these core-only works by publicly providing 94 CTP scans with corresponding magnetic resonance diffusion weighted imaging (MR-DWI) annotations representing the ground truth for the core regions. The network that won the ISLES Challenge 2018, proposed by Song et al. in "Integrated extractor, generator and segmentor for ischemic stroke lesion segmentation", International MICCAI Brainlesion Workshop, pages 310-318, Springer, 2018, and later improved in the follow-up work by Wang et al. in "Automatic Ischemic Stroke Lesion Segmentation from Computed Tomography Perfusion Images by Image Synthesis and Attention-Based Deep Neural Networks", arXiv:2007.03294, comprises three stages. In the first stage the network compresses the 2D+t data of one spatial slice to one single feature map before merging it with the perfusion parameter maps, using a dedicated U-Net. In the context of this challenge, only the perfusion parameter maps for TMAX, CBV, CBF, and MTT were available. The authors have named this first stage network "extractor", because by theory, this model learns which information have positive impact on the segmentation outcome. Thus, it must extract the relevant information from the 2D+t data. In the second stage, the concatenation of parameter maps and the extraction is used to predict a virtual DWI image, as an intermediate step, again using a U-Net. The third stage finally segments the core lesion based on that virtual DWI image.

Other works either directly utilised a modified U-Net on the perfusion maps, see, e.g., Pengbo Liu, "Stroke Lesion Segmentation with 2D Convolutional Neutral Network and Novel Loss Function", International MICCAI Brainlesion Workshop, 2018, or Dolz et al., "Dense Multi-Path U-Net for Ischemic Stroke Lesion Segmentation in Multiple Image Modalities", arXiv:1810.07003. A patch-wise approach with elastic transformations was proposed by Clèrigues et al., "Ensemble of convolutional neural networks for acute stroke anatomy differentiation", International MICCAI Brainlesion Workshop, 2018. All these works also disclose modifications regarding the loss in order to address class imbalance problems.

In another work, a deep learning approach predicting the core and the penumbra was proposed by Lucas et al., "Learning to Predict Ischemic Stroke Growth on Acute CT Perfusion Data by Interpolating Low-Dimensional Shape Representations", Frontiers in Neurology 9: 989, 2018. Instead of using MR-DWI data to derive a ground truth, the CTP dataset itself was evaluated to delineate the core and penumbral region. Ground truth data for the core was annotated based on the CBV map and penumbra and core on the TTD map, wherein the latter approach was based on the assumption that the TTD map fully covers the penumbra region. A U-Net was used for the segmentation. Lucas et al. further proposed a second stage, wherein the core and penumbra prediction would be used in an encoder-decoder network to model the progression between the core and penumbra on a lower feature space. The interpolation serves to model the infarct growth and to predict the clinically plausible tissue outcome.

SUMMARY

An issue of the deep learning-based approaches is the lack of reliable ground truth data, in particular regarding the penumbra. Additionally, correlations of the core and penumbra regions are not yet taken into account.

Embodiments of the present invention provide methods and systems allowing an improved, in particular more robust and/or reliable, segmentation of core and penumbra in an image region of a brain comprising ischemic cerebral tissue.

This is achieved by providing the methods, systems, computer programs and electronically readable storage mediums according to the independent claims. Advantageous embodiments are described by the dependent claims.

At least one example embodiment provides a computer-implemented segmentation method for segmenting a core and a penumbra in a four-dimensional computed tomography perfusion dataset of ischemic tissue in an image region of a patient, the method including determining at least one parameter map for at least one perfusion parameter from the computed tomography perfusion dataset; and using the at least one parameter map and the computed tomograph perfusion dataset as input data to a trained function to determine output data, the output data including segmentation information of the penumbra and the core.

In an example embodiment, the trained function comprises at least one subfunction.

In an example embodiment, the computed tomography perfusion dataset is used as input data for a first subfunction determining intermediate feature data, wherein the intermediate feature data is supplied with the at least one perfusion map to at least one second subfunction for determining the output data.

In an example embodiment, separate and independent subfunctions receiving intermediate data from an upstream subfunction are used to determine first segmentation information relating to the penumbra or a combined region of the penumbra and the core, and second segmentation information relating only to the core, respectively.

At least one example embodiment provides a computer-implemented training method for providing a trained function for segmenting a core and a penumbra in a four-dimensional computed tomography perfusion dataset of ischemic tissue in an image region of a patient, wherein the trained function is adapted to use input data, the input data comprising the computed tomography perfusion dataset and at least one parameter map for at least one perfusion parameter determined from the computed tomography perfusion dataset, to determine output data comprising segmentation information of the penumbra and the core, the training method including determining training datasets comprising input training data and associated output training data, wherein the output training data are at least partially determined by, receiving training information, the training information comprising input training data and associated ground truth data, the ground truth data comprising at least one follow-up examination dataset of at least a part of the imaging region acquired after a recanalization procedure and at least one binary success indicator, the at least one binary success indicator describes whether the recanalization procedure was successful or not, for each set of ground truth data, if the success indicator indicates a successful recanalization procedure, annotating all segmented irreversibly injured ischemic tissue in the follow-up examination dataset as core, else annotating all segmented ischemic tissue in the follow-up examination dataset as penumbra and core, to determine the training output data; and training a function based on the training datasets, and providing the trained function.

In an example embodiment, the at least one follow-up examination dataset is chosen from a group of a diffusion weighted imaging dataset, a further computed tomography perfusion dataset, and a non-contrast computed tomography dataset.

In an example embodiment, separate and independent subfunctions of the trained function are used, wherein the separate and independent subfunctions comprise a penumbra subfunction to determine first segmentation information relating to the penumbra or combined region of the penumbra and the core, and a core subfunction to determine second segmentation information relating only to the core, respectively, when training on output training data only comprising penumbra and core segmentation information, training of the core subfunction is disabled, and when training on output training data only comprising core segmentation information, training of the penumbra subfunction is disabled.

In an example embodiment, training is performed using batches of multiple training datasets, wherein the batches are determined such that each batch contains a comparable number of training datasets based on a successful recanalization procedure and training datasets based on an unsuccessful recanalization procedure.

In an example embodiment, the function is pretrained based on pretraining data before training using the training datasets, wherein output pretraining data is determined using thresholding on the respective at least one perfusion parameter map to segment both the penumbra and the core.

In an example embodiment, the pretraining uses a loss function for the penumbra, a loss function for the core and a loss function concerning the relation between penumbra and core.

In an example embodiment, at least one of the training datasets is received comprising output training data determined from at least one of a diffusion weighted imaging dataset or a perfusion weighted imaging dataset acquired by a magnetic resonance device in the at least same state of the patient as the computed tomography perfusion dataset.

At least one example embodiment provides a segmentation system for segmenting a core and a penumbra in a four-dimensional computed tomography perfusion dataset of ischemic tissue in an image region of a patient, comprising a first interface configured to receive the computed tomography perfusion dataset and a second interface configured to receive at least one parameter map for at least one perfusion parameter determined from the computed tomography perfusion dataset, a segmentation unit configured to apply a trained function to input data comprising the at least one parameter map and the computed tomography perfusion dataset, wherein output data comprising segmentation information of the penumbra and the core is generated and a third interface configured to provide the output data.

At least one example embodiment provides a training system for providing a trained function for segmenting a core and a penumbra in a four-dimensional computed tomography perfusion dataset of ischemic tissue in an image region of a patient, wherein the trained function is adapted to use input data, the input data comprising the computed tomography perfusion dataset and at least one parameter map for at least one perfusion parameter determined from the computed tomography perfusion dataset, to determine output data comprising segmentation information of the penumbra and the core, the training system comprising a first training interface configured to receive training information; a training dataset compilation unit configured to determine training datasets comprising input training data and associated output training data, the training dataset compilation unit comprises an output training data determination subunit configured to evaluate training information comprising input training data and associated ground truth data, the ground truth data comprising at least one follow-up examination dataset of at least a part of the imaging region acquired after a recanalization procedure and at least one binary success indicator, the at least one binary success indicator describes whether the recanalization procedure was successful, by, for each such training information set, if the success indicator indicates a successful recanalization procedure, annotating all segmented irreversibly injured ischemic tissue in the follow-up examination dataset as core, else annotating all segmented ischemic tissue in the follow-up examination dataset as penumbra and core, to determine the training output data; a training unit configured to train a function based on the training datasets; and a second training interface configured to provide the trained function.

At least one example embodiment provides a computer program, when executed by a computing device, is configured to cause a computing device to perform a method according to example embodiments.

At least one example embodiment provides an electronically readable storage medium including computer readable instructions, when executed by a computing device, are configured to cause the computing device to a method according to example embodiments.

BRIEF DESCRIPTION OF THE DRAWINGS

Other objects and features of the present invention will become apparent from the following detailed description considered in conjunction with the accompanying drawings. The drawings, however, are only principle sketches designed solely for the purpose of illustration and do not limit embodiments of the present invention. The drawings show.

DETAILED DESCRIPTION

Figure 1:
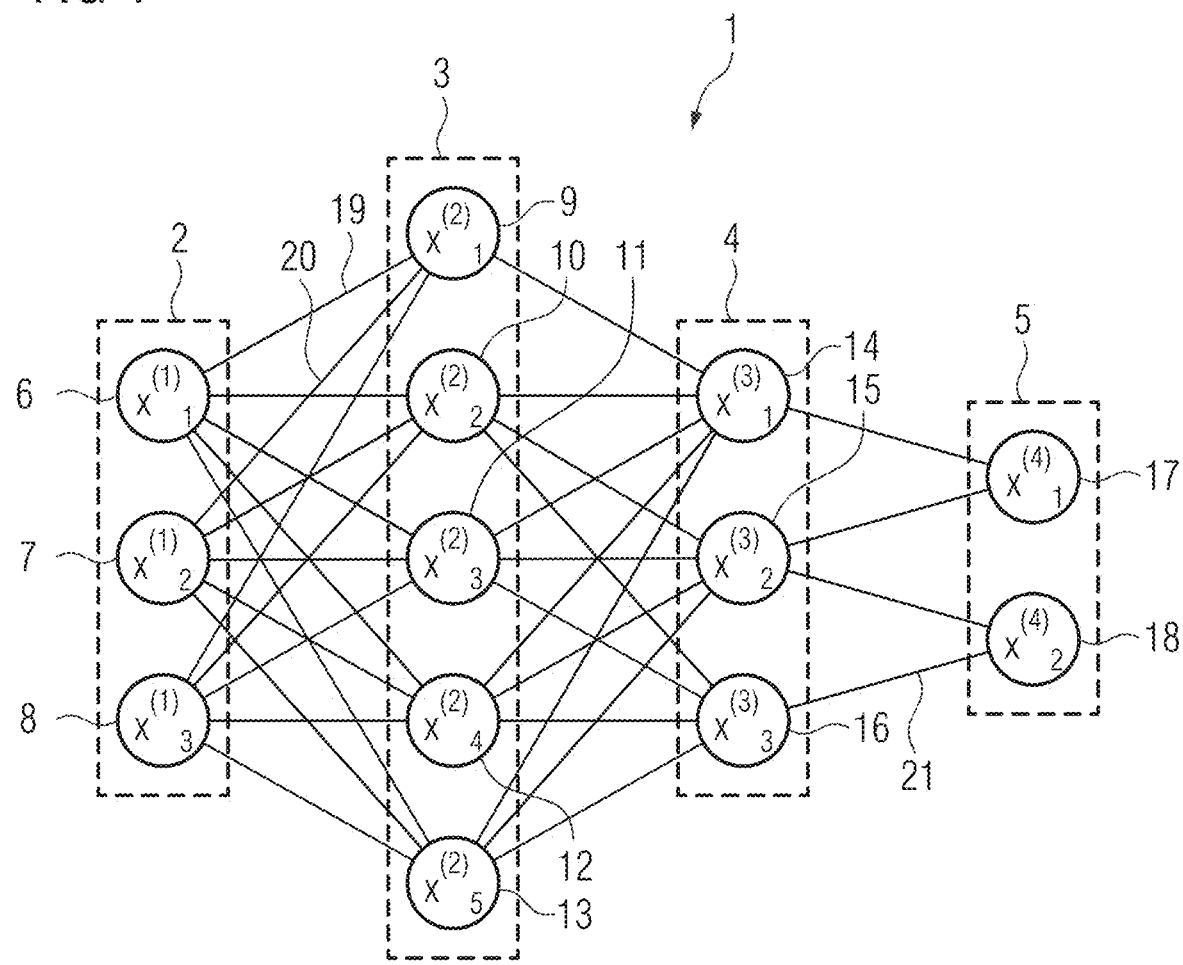
FIG. 1 illustrates an embodiment of a neural network.

In the following, a solution according to embodiments of the present invention is described with respect to the claimed systems as well as with respect to the claimed methods. Features, advantages or alternative embodiments herein can be assigned to the other claimed objects and vice versa. In other words, the systems can be improved with features described or claimed in the context of the methods. In this case, the functional features of the method may, for example, be embodied by functional units of the system.

Furthermore, in the following the solution according to embodiments of the present invention is described with respect to methods and systems for segmentation as well as with respect to methods and systems for training. Features, advantages or alternative embodiments herein can be assigned to the other claimed objects and vice versa. In other words, claims for methods and systems for training can be improved with features described or claimed in context of the methods and systems for segmentation, and vice versa.

In particular, the trained function of the methods and systems for segmentation can be adapted by the methods and systems for training. Furthermore, the input data can comprise advantageous features and embodiments of the training input data, and vice versa. Furthermore, the output data can comprise advantageous features and embodiments of the output training data, and vice versa.

In a segmentation method as originally described, according to embodiments of the present invention, the trained function uses the computed tomography perfusion dataset as additional input data.

Hence, embodiments of the present invention propose to not only use the perfusion parameter maps derived from the CPT dataset as input data for an artificial intelligence trained function, but also the originally measured 4D (3D+t) CTP dataset (cine dataset) itself. As the core region correlates to some extent with the penumbra region, it is possible to extract common features based on this raw data. This information may be additionally used to improve robustness and reliability of the results of the trained function. Anatomical structures and the like can be additionally taken into account.

This also separates embodiments of the present invention, which employ a deep learning approach on (additionally) the CPT dataset, from thresholding approaches, which do not consider anatomical structures. Thresholding methods are restricted to few parameter maps, which might not suffice for the exact delineation of the core and the penumbra lesions. Taking anatomical structures into account in particular avoids false segmentation close to the skull basis or the skull cap. It is noted that preliminary results in Florian Thamm, "Ischemic Stroke Segmentation on CT-Perfusion Data using Deep Learning Methods", Master Thesis, 2019, compared the plain U-Net architecture with the default thresholding of a software approach. A plain U-Net architecture applied on all available parameter maps leads to a Dice-Score of 0.425 compared to the thresholding approach achieving a Dice-Score of only 0.198. MR-DWI annotations were used as the ground truth.

According to embodiments of the present invention, a computed tomography perfusion dataset is acquired using a computed tomography device. This step may have already form part of the segmentation method according to embodiments of the present invention. From this CTP dataset, as known in the art, perfusion parameter maps are derived. In preferred embodiments, the at least one perfusion parameter may be chosen from the group comprising cerebral blood flow (CBF), cerebral blood volume (CBV), mean transit time (MTT), time to maximum (TMAX), time to peak (TTP) and time to drain (TTD).

The at least one, preferably multiple, perfusion parameter map and the CTP dataset itself are then used as input data for a trained function, wherein, as further discussed below, input data may be entered into the trained function in different stages, in particular into different subfunctions. The resulting segmentation information provides an outstanding basis for a medical practitioner, in particular a physician, to judge the extent of the ischemia, in particular the acute stroke, in the brain and/or decide on further treatment of the patient, in particular whether a recanalization procedure (revascularization procedure/reperfusion procedure) shall be performed.

In general, a trained function mimics cognitive functions that humans associate with other human minds. In particular, by training based on training data the trained function is able to adapt to new circumstances and to detect and extrapolate patterns. That is, parameters of a trained function can be adapted by training. In particular, supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function may comprise a neural network, a support vector machine, a decision tree and/or a Bayesian network, and/or the trained function can be based on k-means clustering, Q-learning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network (GAN).

In preferred embodiments, the trained function comprises at least one CNN, in particular at least one U-Net. U-Nets have particular advantages with respect to biomedical image segmentation, which may also be exploited in the current invention.

In preferred embodiments, the trained function comprises at least one subfunction, in particular neural network. For example, the trained function may consist of at least two neural networks. Subfunctions may improve the topology of the trained function and allow a structure where dedicated, separable tasks may be performed by independent subfunctions.

For example, in a preferred embodiment, the computed tomography perfusion dataset may be used as, in particular sole, input data for a first subfunction determining intermediate feature data, wherein the intermediate feature data is supplied together with the at least one perfusion map to at least one second subfunction for determining the output data. Such a subfunction, in particular neural network, may also be termed "extraction predictor" and may be used to extract the above-mentioned relevant features additional to the parameter maps, for example features describing the correlation between penumbra and core. The time-dependent CTP dataset may be reduced into an image of arbitrary shape, either two- or three-dimensional dependent on the embodiment. In preferred embodiments, the output of the first subfunction may have dimensions equal to the perfusion parameter maps, such that it can be easily concatenated with the parameter maps to provide the input for the at least one second subfunction.

Further preferably, separate, independent, in particular second, subfunctions receiving intermediate data from an upstream, in particular second, subfunction are used to determine first segmentation information relating to the penumbra or both the penumbra and the core, and second segmentation information relating to the core, respectively. In an especially preferred embodiment, the upstream second subfunction may receive the output of the first subfunction and the at least one parameter map. This upstream second subfunction may also be called "common predictor". The common predictor receives the perfusion parameter maps, e.g. CBV, CBF, TMAX, TTD, etc., alongside with the extraction predictor result and processes it to calculate higher level features relevant for both the penumbra extraction and the core extraction. This intermediate data is forwarded into specific branches for the penumbra, a second subfunction which may be called "penumbra predictor", and the core, the second subfunction which may be called "core predictor", both returning respective segmentation maps as output.

The penumbra predictor can, in principle, be trained in two different manners. In a first variant, the penumbra predictor may determine segmentation information relating only to the penumbra itself, such that the first segmentation information and the second segmentation information of the core predictor only need to be concatenated to determine segmentation information for both the core and the penumbra. However, in a preferred embodiment, the first segmentation information may relate to the composite region of core and penumbra. In such a case, that is, if the first segmentation information relates to the core and the penumbra, segmentation information relating to the penumbra is determined by removing the segmented core according to the second segmentation information from the first segmentation information.

It should be noted at this point that the data may be processed, in some embodiments, for the whole image region in one go. However, it is also possible, in other embodiments, to apply the trained function in a patch-wise manner or onto slices (two-dimensional sub-datasets). While, as already laid out above, it is preferred to use convolutional neural networks, in particular U-nets, the subfunctions are not restricted to any shape, except the input of the extraction predictor and the perfusion map channels of the common predictor and the output maps of the penumbra and the core predictor.

Most preferably, the trained function was provided by a training method according to embodiments of the present invention.

Such a computer-implemented training method for providing a trained function for segmenting a core and penumbra in a four-dimensional (3D+t) computer tomography perfusion dataset of ischemic tissue in an image region of a patient, wherein the trained function is adapted to use input data, comprising the computer tomography perfusion dataset and at least one parameter map for at least one perfusion parameter determined from the computer tomography perfusion dataset, to determine output data comprising segmentation information of the penumbra and the core, comprises the following steps:

determining training datasets comprising input training data and associated output training data, wherein the output training data are at least partially determined by:
receiving training information comprising input training data and associated ground truth data, the ground truth data comprising at least one follow-up examination dataset of at least part of the imaging region acquired after a recanalizing procedure and at least one binary success indicator, which describes whether the recanalization procedure was successful or not,
for each set of ground truth data, if the success indicator indicates a successful recanalization procedure, annotating all segmented irreversibly injured ischemic tissue in the follow-up examination dataset as core, else annotating all segmented irreversibly injured ischemic tissue in the follow-up examination dataset as penumbra and core, to determine the training output data,
training a function based on the training datasets, and providing the trained function.

The training scheme according to embodiments of the present invention solves, on the one hand, the problem of limited ground truth data and, on the other hand, the prediction of penumbra and core by using only one follow-up image. If a recanalizing procedure (reperfusion procedure/revascularization procedure) is performed on a patient, usually, since the patient is no longer acute, a follow-up imaging examination is performed to check in which extent the recanalization procedure was successful. Since more time is available, the at least one follow-up examination dataset may, preferably, be a magnetic resonance dataset. In particular, the at least one follow-up examination dataset may be a diffusion weighted imaging (DWI) dataset acquired using a magnetic resonance imaging device. However, at least one of the at least one follow-up examination dataset may also be a further computed tomography perfusion dataset or a non-contrast computed tomography (NCCT) dataset.

In most of the cases, acute MR-PWI and/or MR-DWI datasets (perfusion weighted imaging/diffusion weighted imaging) are not available. The current invention allows to use the follow-up examination data only and still being able to derive ground truth data. The follow-up examination dataset usually visualizes only the infarcted region. The main idea of the training method according to embodiments of the present invention is to distinguish cases of failed and cases of successful recanalization procedures. If the recanalization procedure was unsuccessful, penumbra evolves into core, so that the final follow-up lesion appears larger and can be assumed to be the union of core and penumbra from the acute CTP dataset. If, however, the recanalization procedure was successful, the penumbra is again sufficiently supplied with blood and disappears, such that the remaining core lesion is essentially the same as the core lesion that was already visible in the initial, acute CTP scan. Hence, each follow-up examination dataset, depending on the binary success indicator, provides ground truth data either relating to the combined region of penumbra and core, or to core only.

Contrary to most approaches known in the state of the art, which only focus on the prediction of the core, the training scheme of the current invention allows to use the follow-up examination combined with the recanalization outcome to predict both penumbra and core. If the binary success indicator was not taken into account and machine learning (training) was nonetheless performed based on follow-up examination datasets, the recanalization outcome basically becomes a random factor leading to an inconsistent prediction of actual penumbra and/or core regions. However, using the training method of the current invention, it is possible to preserve a consistent learning procedure and to predict penumbra and core at the same time, while it is still possible to model anatomical relations between both. Regarding the state of the art by Lucas et al., as discussed above, also the core and the penumbra are predicted, however, the penumbra prediction is driven by the assumption that the penumbra lesion is exactly delineated in the TTD parameter map. The training method according to embodiments of the present invention, however, predicts the actual penumbra lesion driven by the assumption that penumbra tissue evolves into core if no recanalization was established in a timely fashion. Hence, the penumbra is handled evidence-based following closely the definition of penumbral tissue, leading to improved results.

However, training datasets derived from follow-up examinations and a success indicator are not suitable for standard supervised training, since ground truth masks would have to be provided for both output channels, that is segmentation information of the penumbra (in particular first segmentation information) and segmentation information for the core (in particular second segmentation information). A naïve approach would be to backpropagate the ground truth for the core mask or the penumbra mask, whichever is available according to the success indicator, and respective empty masks for the other path. However, this is less advantageous, since the resulting gradients would be noisy and may lead the trained function to predict either penumbra or core as empty masks, as provided. Furthermore, the above-discussed common predictor (upstream second subfunction) would not be able to model relations between the core and the penumbra.

Hence, in a preferred, advantageous embodiment of the training method according to embodiments of the present invention, if separate, independent subfunctions, in particular second subfunctions, of the trained function are used, wherein the separate, independent subfunctions comprise a penumbra subfunction to determine first segmentation information relating to the penumbra or the penumbra and the core, and a core subfunction to determine second segmentation information relating to the core, respectively, when training on output training data only comprising penumbra and core segmentation information, training of the core subfunction is disabled, and when training on output training data only comprising core segmentation information, training of the penumbra subfunction is disabled.

In other words, the penumbra predictor (penumbra subfunction) may be trained separately from the core predictor (core subfunction), while still being able to backpropagate through the upstream, in particular second, subfunction, in particular the common predictor, and, optionally, the extraction predictor (first subfunction). The idea underlying this concept is to guide the penumbra subfunction and the core subfunction to predict their specific lesion types, wherein the upstream subfunction, in particular the common predictor, combines the information of the CTP dataset, in particular the output of the first subfunction, and the parameter maps, such that the upstream subfunction and, optionally, the first subfunction (extraction predictor) benefit from this training. It is noted that, if the second segmentation information is relating only to the penumbra, it is assumed that the penumbra completely encloses the core.

In an especially preferred embodiment in this context, training may be performed using batches of multiple training datasets, wherein the batches are determined such that each batch contains a comparable, in particular at least essentially equal, amount of training datasets based on a successful recanalization procedure and of training datasets based on an unsuccessful recanalization procedure. Advantageously, the function may be trained batch-wise using stratified batches since, for example, a batch containing only core or only penumbra cases might disturb regularization terms and momentum terms for the optimization of upstream subfunctions, in particular the common predictor and the extraction predictor. This problem can be solved by summing the gradients which originate from the penumbra path and the gradients originating from the core path. It is noted that this special optimization scheme during training has no influence on the inference scheme. The resulting trained function can still be used to predict both, penumbra and core, during inference.

Preferably, the function may be pretrained based on pretraining data before training using the training datasets, wherein the output pretraining data is determined using thresholding on the respective perfusion parameter maps to segment both the penumbra and the core. In order to prepare the function, in particular since usually not many training datasets for the main training will be available, a pretraining is performed using the already existing threshold methods. Thresholding is applied to the CTP dataset from the input pretraining data, for example by using the thresholding levels/values proposed in the article by Abels et al. cited above. The thresholding yields segmentation results, that is a ground truth, for both the penumbra and the core.

Hence, as opposed to other deep learning approaches training their functions from scratch, the current invention in this embodiment proposes a pretraining approach to guide the function into learning the coarse regions using thresholding. In principle, pretraining is known technique to either accelerate the training process or to enforce faster convergency compared to training from scratch. In the context of the current invention, the thresholding values are determined based on an evidence basis, thus represent plausible preliminary ground truths. This is advantageous since threshold values exist for both penumbra and core, allowing to pretrain the whole function, in particular all subfunctions, at once. Furthermore, this can be done without any significant cost, as no human actions are required.

In this context, a preferred embodiment proposes that the pretraining uses, for describing deviations from the ground truth given by the output pretraining data, a loss function for the penumbra, a loss function for the core and a loss function concerning the relation between penumbra and core. Three independent loss functions may be introduced, which address the direct segmentation of the penumbra and the core, respectively, as well as the relations between penumbra and core. The loss functions relating to the penumbra and the core prediction are used to optimize regarding plausible penumbra and core segmentation information. On the other hand, using the loss function concerning the relation between penumbra and core can be used to enforce at least one property regarding the penumbra and the core by constructing this loss function accordingly. For example, the penumbra lesion should be larger than the core and the segmented penumbra should enclose the core region (if only penumbra is segmented) or overlap with the core region (if the composite region of penumbra and core is predicted as first segmentation information). By using all three loss functions, the network not only provides improved segmentation of the penumbra and the core themselves, but also learns the non-linear relations between the parameter maps and the segmentations of the core and the penumbra region.

However, since the pretrained function (as does the thresholding) still yields noisy segmentations, additionally, the main training step described above is used.

In a further preferred embodiment of the training method, at least one of the training datasets is received already comprising output training data determined from a diffusion weighted imaging dataset and/or a perfusion weighted imaging dataset acquired by a magnetic resonance device in the at least essentially same state of the patient as the computer tomography perfusion dataset. For example, a combined CT-MR imaging device may be used. All these datasets are also called "acute datasets", since they are acquired if a stroke emergency patient is to be medically treated as soon as possible. If acute MR-PWI and MR-DWI acquisitions are available additional to the acute CTP dataset, the PWI and DWI datasets may be used to derive the ground truth regarding both the penumbra and the core and the function can be trained for both penumbra and core segmentation simultaneously using this training dataset. In particular, if a penumbra subfunction and a core subfunction are used, both can be trained by back propagation simultaneously and in a combined manner, of course additionally including the upstream subfunction supplying the intermediate data and, if applicable, the first subfunction. The ground truth for the composite region of penumbra and core can be derived from the PWI dataset, while the ground truth regarding the core can be derived from the DWI dataset. It is noted that, in this case, all three loss functions as discussed with respect to pretraining can also be applied here.

However, since training datasets based on acute CTP datasets and corresponding DWI and PWI datasets are very rare, advantageously the current invention may provide additional training datasets by evaluating follow-up examination datasets and respective success indicators.

A segmentation system according to embodiments of the present invention comprises, for segmenting a core and a penumbra in a four-dimensional computer tomography perfusion dataset of ischemic tissue in an image region of a patient:
a first interface for receiving the computer tomography perfusion dataset and a second interface for receiving at least one parameter map for at least one perfusion parameter determined from the computer tomography perfusion dataset, a segmentation unit, configured to apply a trained function to input data comprising the at least one parameter map and the computer tomography perfusion dataset, wherein output data comprising segmentation information of the penumbra and the core is generated and
a third interface configured for providing the output data.

In other words, the segmentation system is configured to perform a segmentation method according to embodiments of the present invention. The segmentation system may, for example, be part of an evaluation device, in particular also having a determination unit for the at least one parameter map. In preferred embodiments, such an evaluation device may be realized in a computer tomography imaging system, in particular in a control device of such a CT imaging system, wherein the control device may additionally comprise an acquisition unit for controlling the acquisition of the computer tomography perfusion dataset.

The segmentation system, the evaluation device and the control device may all comprise at least one processor and at least one storage means.

A training system according to embodiments of the present invention comprises, for providing a trained function for segmenting a core and a penumbra in a four-dimensional computer tomography perfusion dataset of ischemic tissue in an image region of a patient, wherein the trained function is adapted to use input data, comprising the computer tomography perfusion dataset and at least one parameter map for at least one perfusion parameter determined from the computer tomography perfusion dataset, to determine output data comprising segmentation information of the penumbra and the core:
a first training interface for receiving training information,
a training dataset compilation unit, configured to determine training datasets comprising input training data and associated output training data, which comprises an output training data determination subunit, configured to evaluate training information comprising input training data and associated ground truth data, the ground truth data comprising at least one follow-up examination dataset of at least a part of the imaging region acquired after a recanalization procedure and at least one binary success indicator, which describes whether the recanalization procedure was successful or not, by, for each such training information set, if the success indicator indicates a successful recanalization procedure, annotating all segmented irreversibly injured ischemic tissue in the follow-up examination dataset as core, else annotating all segmented irreversibly injured ischemic tissue in the follow-up examination dataset as penumbra and core, to determine the training output data,
a training unit for training a function based on the training datasets, and
a second training interface for providing the trained function.

In other words, the training system is configured to perform a training method according to embodiments of the present invention. The training system may comprise at least one computing device having at least one processor and/or at least one storage means.

Computer programs according to the current invention comprise program means to perform the steps of a training method and/or a segmentation method according to the current invention when the computer program is executed on a computing device, in particular a computing device of a segmentation system and/or a training system. The computer program may be stored on an electronically readable storage medium according to embodiments of the present invention, which thus has control information stored thereon, the control information comprising at least a computer program according to embodiments of the present invention such that, when the electronically readable storage medium is used in a computing device, in particular of a segmentation system and/or a training system, a segmentation method and/or a training method according to the current invention are executed. The electronically readable storage medium according to embodiments of the present invention may be a non-transitional storage medium, for example a CD-ROM.

FIG. 1 displays an embodiment of an artificial neural network 1. Alternative terms for "artificial neural network" are "neural network", "artificial neural net" or "neural net".

The artificial neural network 1 comprises nodes 6-18 and edges 19-21, wherein each edge 19-21 is a directed connection from a first node 6-18 to a second node 6-18. In general, the first node 6-18 and the second node 6-18 are different nodes 6-18. It is also possible that the first node 6-18 and the second node 6-18 are identical. For example, in FIG. 1 the edge 19 is a directed connection from the node 6 to the node 9, and the edge 20 is a directed connection from the node 7 to the node 9. An edge 19-21 from a first node 6-18 to a second node 6-18 is also denoted as "ingoing edge" for the second node 6-18 and as "outgoing edge" for the first node 6-18.

In this embodiment, the nodes 6-18 of the artificial neural network 1 can be arranged in layers 2-5, wherein the layers 2-5 can comprise an intrinsic order introduced by the edges 19-21 between the nodes 6-18. In particular, edges 19-21 can exist only between neighboring layers of nodes 6-18. In the displayed embodiment, there is an input layer 2 comprising only nodes 6-8 without an incoming edge, an output layer 5 comprising only nodes 17, 18 without outgoing edges, and hidden layers 3, 4 in-between the input layer 2 and the output layer 5. In general, the number of hidden layers 3, 4 can be chosen arbitrarily. The number of nodes 6-8 within the input layer 2 usually relates to the number of input values of the neural network, and the number of nodes 17, 18 within the output layer 5 usually relates to the number of output values of the neural network.

In particular, a (real) number can be assigned as a value to every node 6-18 of the neural network 1. Here, $x(n)_i$ denotes the value of the i-th node 6-18 of the n-th layer 2-5. The values of the nodes 6-8 of the input layer 2 are equivalent to the input values of the neural network 1, the values of the nodes 17, 18 of the output layer 5 are equivalent to the output values of the neural network 1. Furthermore, each edge 19-21 can comprise a weight being a real number, in particular, the weight is a real number within the interval [−1, 1] or within the interval [0, 1]. Here, $w(m,n)_{i,j}$ denotes the weight of the edge between the i-th node 6-18 of the m-th layer 2-5 and the j-th node 6-18 of the n-th layer 2-5. Furthermore, the abbreviation $w(n)_{i,j}$ is defined for the weight $w(n,n+1)_{i,j}$.

In particular, to calculate the output values of the neural network 1, the input values are propagated through the neural network 1. In particular, the values of the nodes 6-18 of the (n+1)-th layer 2-5 can be calculated based on the values of the nodes 6-18 of the n-th layer 2-5 by $$x_j^{(n+1)} = f(\rho_j x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network 1, wherein values of the input layer 2 are given by the input of the neural network 1, wherein values of the first hidden layer 3 can be calculated based on the values of the input layer 2 of the neural network 1, wherein values of the second hidden layer 4 can be calculated based in the values of the first hidden layer 3, etc.

In order to set the values w(m,n)i,j for the edges 19-21, the neural network 1 has to be trained using training data. In particular, training data comprises training input data and training output data (denoted as ti). For a training step, the neural network 1 is applied to the training input data to generate calculated output data. In particular, the training data and the calculated output data comprise a number of values, said number being equal to the number of nodes 17, 18 of the output layer 5.

In particular, a comparison between the calculated output data and the training data is used to recursively adapt the weights within the neural network 1 (backpropagation algorithm). In particular, the weights are changed according to $$w'_{i,j}{}^{(n)} = w_{i,j}{}^{(n)} - \gamma \cdot \delta_j{}^{(n)} \cdot x_i{}^{(n)}$$

wherein γ is a learning rate, and the numbers δ(n)j can be recursively calculated as $$\delta_j{}^{(n)} = (\Sigma_k \delta_k{}^{(n+1)} \cdot w_{j,k}{}^{(n+1)}) \cdot f'(\Sigma_i x_i{}^{(n)} \cdot w_{i,j}{}^{(n)})$$

based on δ(n+1)j, if the (n+1)-th layer is not the output layer 5, and $$\delta_j{}^{(n)} = (x_k \delta^{(n+1)} - t_j{}^{(n+1)}) \cdot f'(\Sigma_i x_i{}^{(n)} \cdot w_{i,j}{}^{(n)})$$

if the (n+1)-th layer is the output layer 5, wherein f' is the first derivative of the activation function, and y(n+1)j is the comparison training value for the j-th node of the output layer 5.

Figure 2:
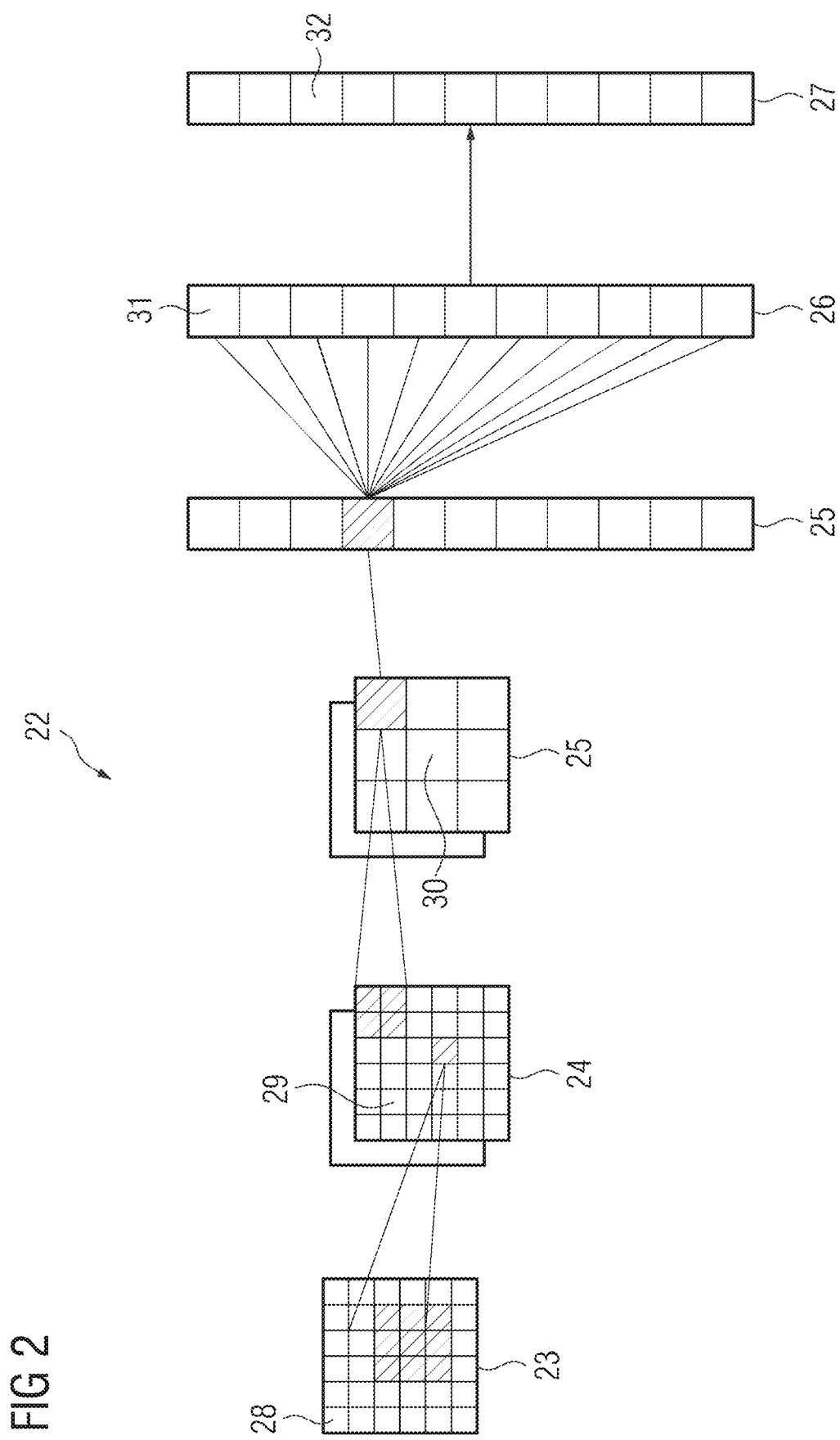
FIG. 2 illustrates an embodiment of a convolutional neural network.

FIG. 2 displays an embodiment of a convolutional neural network 22. In the displayed embodiment, the convolutional neural network 33 comprises an input layer 23, a convolutional layer 24, a pooling layer 25, a fully connected layer 26 and an output layer 27. Alternatively, the convolutional neural network 22 can comprise several convolutional layers 24, several pooling layers 25 and several fully connected layers 26 as well as other types of layers. The order of the layers can be chosen arbitrarily, usually fully connected layers 26 are used as the last layers before the output layer 27.

In particular, within a convolutional neural network 22 the nodes 28-32 of one layer 23-27 can be considered to be arranged as a d-dimensional matrix or as a d-dimensional image. In particular, in the two-dimensional case the value of the node 28-32 indexed with i and j in the n-th layer 23-27 can be denoted as x(n)[i,j]. However, the arrangement of the nodes 28-32 of one layer 23-27 does not have an effect on the calculations executed within the convolutional neural network 22 as such, since these are given solely by the structure and the weights of the edges.

In particular, a convolutional layer 24 is characterized by the structure and the weights of the incoming edges forming a convolution operation based on a certain number of kernels. In particular, the structure and the weights of the incoming edges are chosen such that the values x(n)k of the nodes 29 of the convolutional layer 24 are calculated as a convolution x(n)k=Kk*x(n−1) based on the values x(n−1) of the nodes 28 of the preceding layer 23, where the convolution * is defined in the two-dimensional case as $$x_k{}^{(n)}[i,j] = (K_k * x^{(n-1)})[i,j] = \Sigma_i \Sigma_j K_k[i',j'] \cdot x^{(n-1)}[i-i',j-j'].$$

Here the k-th kernel Kk is a d-dimensional matrix (in this embodiment a two-dimensional matrix), which is usually small compared to the number of nodes 28-32 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 28-32 in the respective layer 23-27. In particular, for a convolutional layer 24 the number of nodes 29 in the convolutional layer is equivalent to the number of nodes 28 in the preceding layer 23 multiplied with the number of kernels.

If the nodes 28 of the preceding layer 23 are arranged as a d-dimensional matrix, using a plurality of kernels can be interpreted as adding a further dimension (denoted as "depth" dimension), so that the nodes 29 of the convolutional layer 24 are arranged as a (d+1)-dimensional matrix. If the nodes 28 of the preceding layer 23 are already arranged as a (d+1)-dimensional matrix comprising a depth dimension, using a plurality of kernels can be interpreted as expanding along the depth dimension, so that the nodes 29 of the convolutional layer 64 are arranged also as a (d+1)-dimensional matrix, wherein the size of the (d+1)-dimensional matrix with respect to the depth dimension is by a factor of the number of kernels larger than in the preceding layer 23.

The advantage of using convolutional layers 24 is that spatially local correlation of the input data can exploited by enforcing a local connectivity pattern between nodes of adjacent layers, in particular by each node being connected to only a small region of the nodes of the preceding layer.

In the displayed embodiment, the input layer 23 comprises 36 nodes 28, arranged as a two-dimensional 6×6 matrix. The convolutional layer 24 comprises 72 nodes 29, arranged as two two-dimensional 6×6 matrices, each of the two matrices being the result of a convolution of the values of the input layer 23 with a kernel. Equivalently, the nodes 29 of the convolutional layer 24 can be interpreted as arranged as a three-dimensional 6×6×2 matrix, wherein the last dimension is the depth dimension.

A pooling layer 25 can be characterized by the structure and the weights of the incoming edges and the activation function of its nodes 30 forming a pooling operation based on a non-linear pooling function f. For example, in the two-dimensional case the values x(n) of the nodes 30 of the pooling layer 25 can be calculated based on the values x(n−1) of the nodes 29 of the preceding layer 24 as $$x^{(n)}[i,j] = f(x^{(n-1)}[id_1,jd_2], \ldots, x^{(n-1)}[id_1+d_1-1,jd_2+d_2-1])$$

In other words, by using a pooling layer 25 the number of nodes 29, 30 can be reduced, by replacing a number d1·d2 of neighboring nodes 29 in the preceding layer 24 with a single node 30 being calculated as a function of the values of said number of neighboring nodes in the pooling layer 25. In particular, the pooling function f can be the max-function, the average or the L2-Norm. In particular, for a pooling layer 25 the weights of the incoming edges are fixed and are not modified by training.

The advantage of using a pooling layer 25 is that the number of nodes 29, 30 and the number of parameters is reduced. This leads to the amount of computation in the network 22 being reduced and to a control of overfitting.

In the displayed embodiment, the pooling layer 25 is a max-pooling, replacing four neighboring nodes with only one node, the value being the maximum of the values of the four neighboring nodes. The max-pooling is applied to each d-dimensional matrix of the previous layer 24; in this embodiment, the max-pooling is applied to each of the two two-dimensional matrices, reducing the number of nodes from 72 to 18.

A fully-connected layer 26 can be characterized by the fact that a majority, in particular, all edges between nodes 30 of the previous layer 25 and the nodes 31 of the fully-connected layer 26 are present, and wherein the weight of each of the edges can be adjusted individually.

In this embodiment, the nodes 30 of the preceding layer 25 of the fully-connected layer 26 are displayed both as two-dimensional matrices, and additionally as non-related nodes (indicated as a line of nodes, wherein the number of nodes was reduced for a better presentability). In this embodiment, the number of nodes 31 in the fully connected layer 26 is equal to the number of nodes 30 in the preceding layer 25. Alternatively, the number of nodes 30, 31 can differ.

Furthermore, in this embodiment the values of the nodes 32 of the output layer 27 are determined by applying the Softmax function onto the values of the nodes 31 of the preceding layer 26. By applying the Softmax function, the sum of the values of all nodes 32 of the output layer 27 is 1, and all values of all nodes 32 of the output layer 27 are real numbers between 0 and 1. In particular, if using the convolutional neural network 22 for categorizing input data, the values of the output layer can be interpreted as the probability of the input data falling into one of the different categories.

A convolutional neural network 22 can also comprise a ReLU (acronym for "rectified linear units") layer. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer. Examples for rectifying functions are $f(x)=\max(0,x)$, the tangent hyperbolics function or the sigmoid function.

In particular, convolutional neural networks 22 can be trained based on the backpropagation algorithm. For preventing overfitting, methods of regularization can be used, e.g. dropout of nodes 28-32, stochastic pooling, use of artificial data, weight decay based on the L1 or the L2 norm, or max norm constraints.

Figure 3:
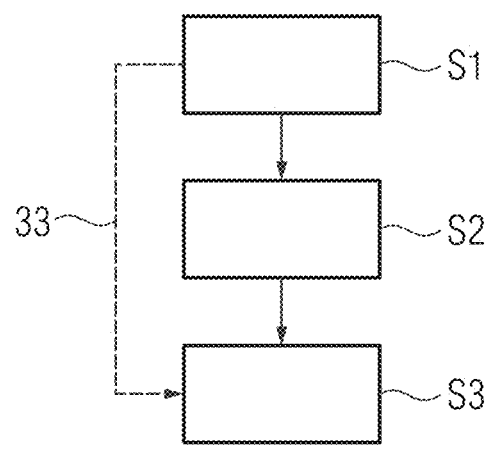
FIG. 3 illustrates a flow chart of an embodiment of a segmentation method.

FIG. 3 is a flowchart of an embodiment of a segmentation method according to embodiments of the present invention. The segmentation method is applied in computed tomography perfusion (CTP) examinations of a patient suffering an acute stroke, i.e. having ischemic cerebral tissue (parenchyma) in the brain, to provide a segmentation information based on which a medical practitioner, in particular a physician, may decide on the further course of treatment, in particular whether and how a recanalization procedure is to be performed as soon as possible. Hence, the segmentation information not only describes the location of the core region, that is ischemic tissue which cannot be saved by treatment, but also the penumbra adjacent to the core, this region containing ischemic tissue which is still viable and can be returned to a normally perfused state by swift action.

In a step S1, which may already form part of the segmentation method, the CPT dataset is acquired from the patient using a computed tomography imaging system. After administering a contrast agent, 3D+t data of the image region of the patient, in particular comprising at least a part of the brain, is imaged over time to provide 3D+t, hence four-dimensional, computer tomography perfusion data visualizing the contrast agent behaviour over time, which provides different measures regarding blood perfusion in the parenchyma of the brain.

Hence, in a step S2, the resulting CTP dataset is evaluated to derive parameter maps, each pertaining to a different perfusion parameter, in the image region. For example, perfusion parameters may comprise cerebral blood flow (CBF), cerebral blood volume (CBV), mean transit time (MTT), time to maximum (TMAX), time to peek (TTP) and time to drain (TTD). The parameter maps may, in particular, be derived from the course of the contrast agent concentration over time in respective image elements (pixel/voxel) of the CTP dataset.

In a step S3, artificial intelligence is employed in the form of a trained function, which has been trained by machine learning, as further described below. The trained function uses input data, which not only comprises the parameter maps derived in step S2, but also the original raw data, that is, the CTP dataset of step S1, as indicated by arrow 33, to derive the segmentation information as output data.

Figure 4:
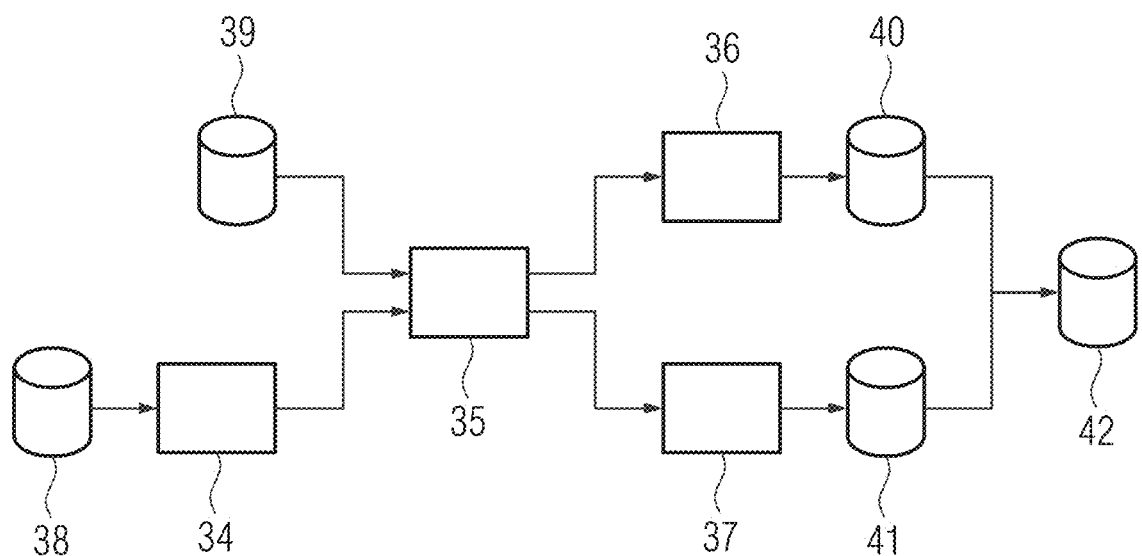
FIG. 4 illustrates an architecture of a trained function used in the segmentation method according to an embodiment.

FIG. 4 shows the trained function architecture, in this case network architecture, in this embodiment. The architecture consists of three stages, wherein the trained function can be applied in a patch-wise manner, consecutively onto two-dimensional slices of the image region, or on the whole three-dimensional data, that is, the whole image region. For all the subfunctions 34, 35, 36 and 37 shown, convolutional neural networks, in particular U-nets, are employed.

The first stage, represented by a first subfunction 34, may be called "extraction predictor" and extracts features relevant for the segmentation process, in particular describing the correlation between penumbra and core, from the time-dependent CTP data in the CTP dataset 35. The output of the first subfunction 34 may be a feature image of arbitrary dimensions, however, a dimensionality equal or comparable to the parameter maps 39 is preferred. The parameter maps 39 and the output of the first subfunction 34, that is, the feature image, are concatenated to form the input into a set of second subfunctions 34, 36 and 37.

The second, upstream subfunction 35 represents the second stage and may be termed "common predictor". The second subfunction 35 receives, as explained, the perfusion parameter maps 39 alongside with the extraction predictor result and processes it to yield intermediate data relevant for both the penumbra segmentation and the core segmentation.

This intermediate data forms the input for the third stage of the trained function, comprising the two second subfunctions 36 and 37, namely a penumbra subfunction 36 and a core subfunction 37. The penumbra subfunction 36 may also be called "penumbra predictor", the core subfunction may also be called "core predictor". In this embodiment, the penumbra subfunction 36 outputs segmentation information 40 describing the combined regions of core and penumbra. However, in other embodiments, the output may also concern only the penumbra region (without the core). The segmentation information 40 may, for example, be a penumbra map/penumbra mask applicable to the image region to mark image elements as belonging to the combined region of penumbra and core or the penumbra, respectively.

The core subfunction 37 outputs second segmentation information 41 relating to only the core. The segmentation information 41 may analogously comprise a core map/core mask.

To determine the final, complete segmentation information 42 comprising a penumbra only map and a core only map, in this embodiment, the image elements marked as core according to the second segmentation information 41 may simply be removed from the combined map of the first segmentation information 40 to leave only the penumbra in this map.

Figure 5:
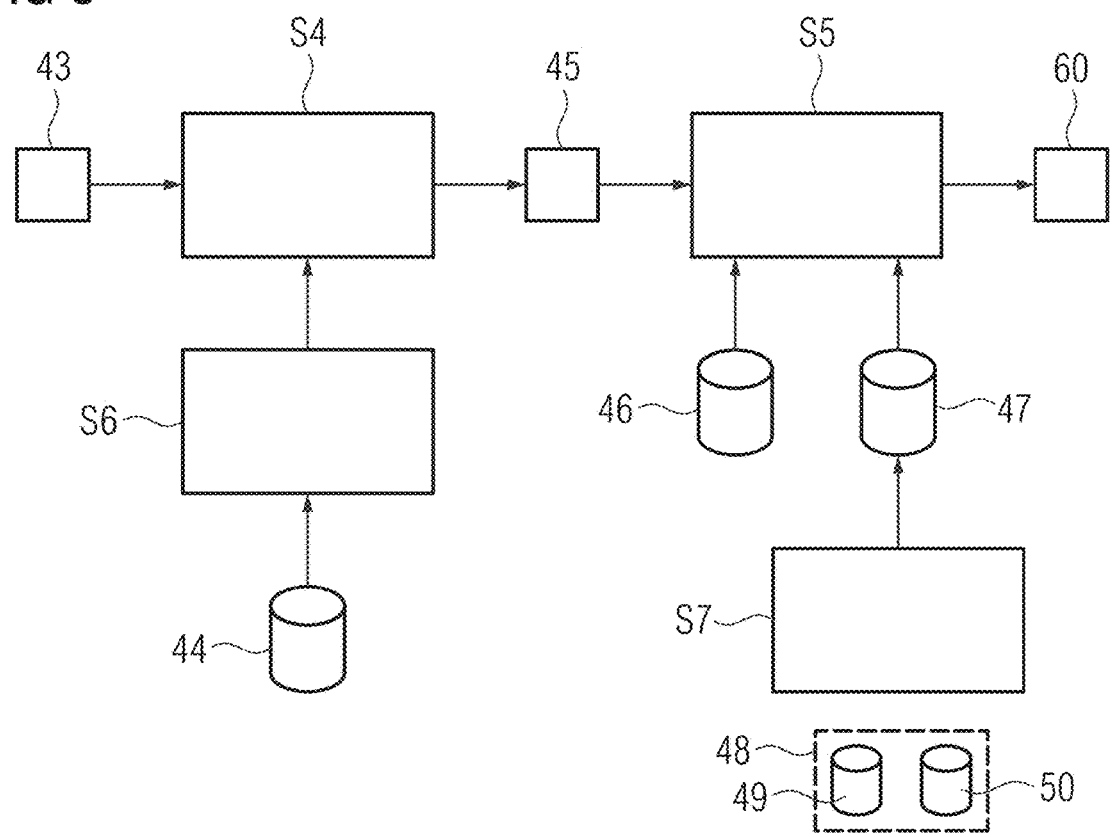
FIG. 5 illustrates a flow chart of a training method for providing the trained function of FIG. 4 according to an embodiment.

The trained function of this segmentation method has been trained in a training method according to embodiments of the present invention, in particular according to the embodiment now described with respect to FIGS. 5-8. Here, FIG. 5 is a flowchart of the training method.

The still untrained function 43, in particular having the architecture described with respect to FIG. 4, is first subjected to a pretraining step S4. Since usually not many training datasets for the main training step S5 are available, pretraining is performed based on already existing threshold methods. To derive pretraining data, the parameter maps of input pretraining datasets 44 are subjected to thresholding in a preparatory step S6 to yield pretraining output data. For example, the thresholding values proposed in the above-mentioned article by Abels et al. may be used to determine segmentations for both the penumbra and the core. Based on the input pretraining data 44 and the so-determined output pretraining data, pretraining is performed in step S4. In this stage of the machine learning, the function is pretrained using three loss functions. While the penumbra subfunction 36 and the core subfunction 37 are optimized using respective loss functions to return plausible penumbra and core maps, optimization is also performed regarding the direct relation between both regions by optimizing a combined loss function concerning the relation between penumbra and core. The latter loss function can be constructed to enforce multiple properties regarding the relation between penumbra and core. For instance, the penumbra lesion is larger than the core and, in this particular embodiment, where the first segmentation information 36 indicates both core and penumbra, the map of the first segmentation information should overlap the core map of the second segmentation information 37. Hence, the function is not only pretrained and optimized regarding independent segmentation of both penumbra and core, but also learns the non-linear relations between the input data and the segmentations of the core and penumbra region. However, since thresholding yields noisy segmentations, the pretraining itself does not suffice to provide the fully trained function, such that the pretrained function 45 is subjected to further training in step S5.

In this second stage of machine learning, it is distinguished based on the available training information. In some cases, in parallel to the CTP acquisition, magnetic resonance acquisitions yielding perfusion weighted imaging (PWI) and diffusion weighted imaging (DWI) datasets are acquired, that is, a first class of training datasets 46 may be derived from corresponding acute CTP datasets and acute PWI and DWI datasets. The PWI lesions represent the core and the penumbra tissue (as a combined region) and the DWI lesions represent the core lesion only. Once respective output training data has been derived from the PWI and the DWI datasets, training of the pretrained function 45 may be performed as usual by backpropagation through the subfunctions 36, 37 simultaneously and in a combined manner through the second upstream subfunction 35 and the first subfunction. All three loss functions as discussed above may be employed in this case. However, such combinations of acute PWI, DWI and CTP scans are rare and do not suffice for acceptable training of the pretrained function 45. Hence, a second, larger group of training datasets 47 is derived from training information 48 comprising input training data 49 and ground truth data 50, in a step S7.

The ground truth data 50 comprises at least one follow-up examination dataset of the imaging region acquired after a recanalization procedure and a binary success indicator, which describes whether the recanalization procedure was successful or not. The follow-up examination dataset is, preferably, a DWI dataset acquired using a magnetic resonance imaging device, but may, of course, also be another CTP scan. Follow-up scans visualize the infarcted region, but it is important to distinguish cases of failed and succeeded recanalization procedures.

Figure 6:
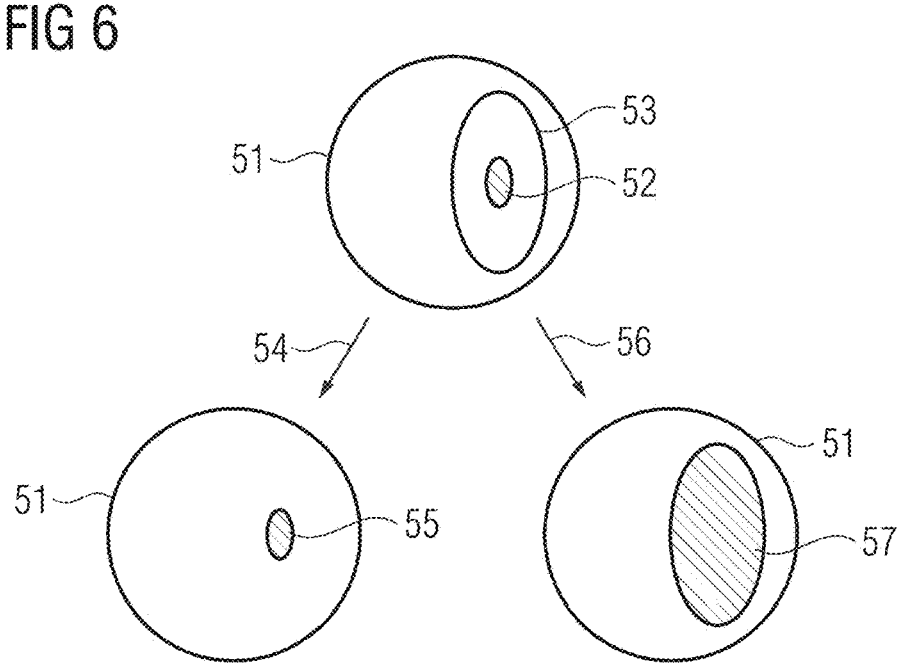
FIG. 6 illustrates a drawing explaining the consequences of succeeded and failed recanalization procedures.

FIG. 6 visualizes the effects of successful or failed recanalization. In the upper half, the acute stroke in the brain 51 is visualized. As discussed, in a region usually named core 52, untreatable, lost cerebral tissue is located. However, in the region named penumbra 53, hypoperfused, but still viable cerebral tissue is located which can be saved by swift treatment, in particular a recanalization procedure.

If the recanalization procedure is successful, arrow 54, the penumbra 53 disappears and only the core 52 remains, meaning the lesion 55 closely overlaps or is equal to the core 52 region. However, if the recanalization procedure fails, arrow 56, penumbra evolves into core, such that the final lesion 57 appears larger and usually covers at least essentially the whole penumbra 53 and the original core 52.

Hence, in step S7 (FIG. 5), output training data for each set of training information 48 is determined such that, if the success indicator indicates a successful recanalization procedure, all segmented irreversibly injured ischemic tissue (lesion 55) is annotated as core 52, and, if the success indicator indicates a failed recanalization procedure, all segmented irreversibly injured ischemic tissue (lesion 57) in the follow-up examination dataset is annotated as a combined region of penumbra 53 and core 52.

Since, however, a complete backpropagation through the architecture shown in FIG. 4 is not possible, since either the first segmentation information or the second segmentation information is available, but not both, the penumbra subfunction 36 may be optimized separately from the core subfunction 37 while still being able to backpropagate through the upstream subfunction 35 and the first subfunction 34. This is schematically shown in FIGS. 7 and 8.

Figure 7:
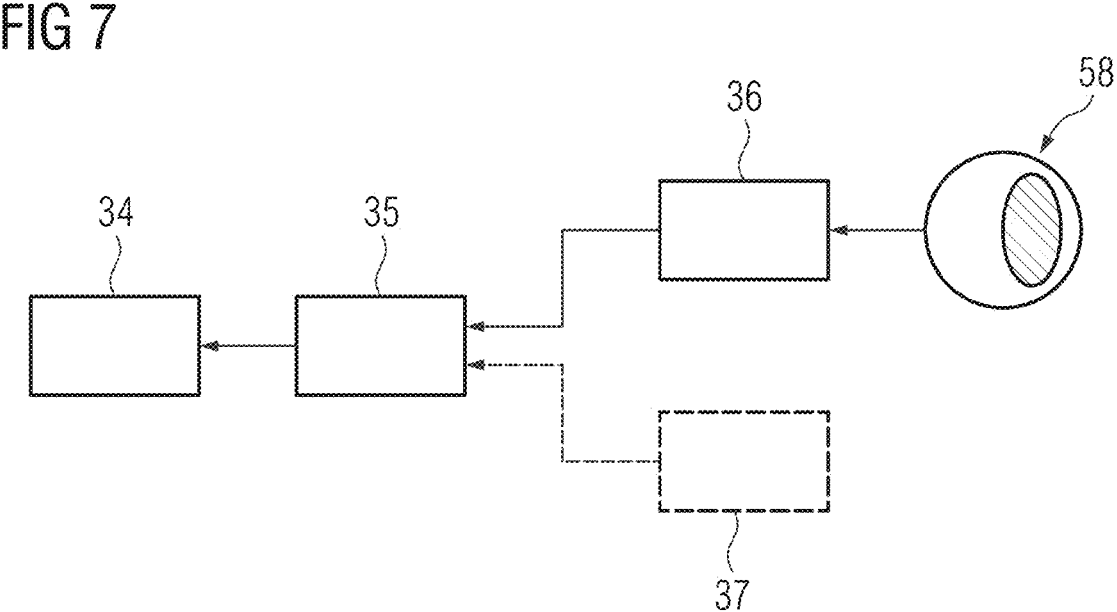
FIG. 7 illustrates a training scheme for a case of failed recanalization.
Figure 8:
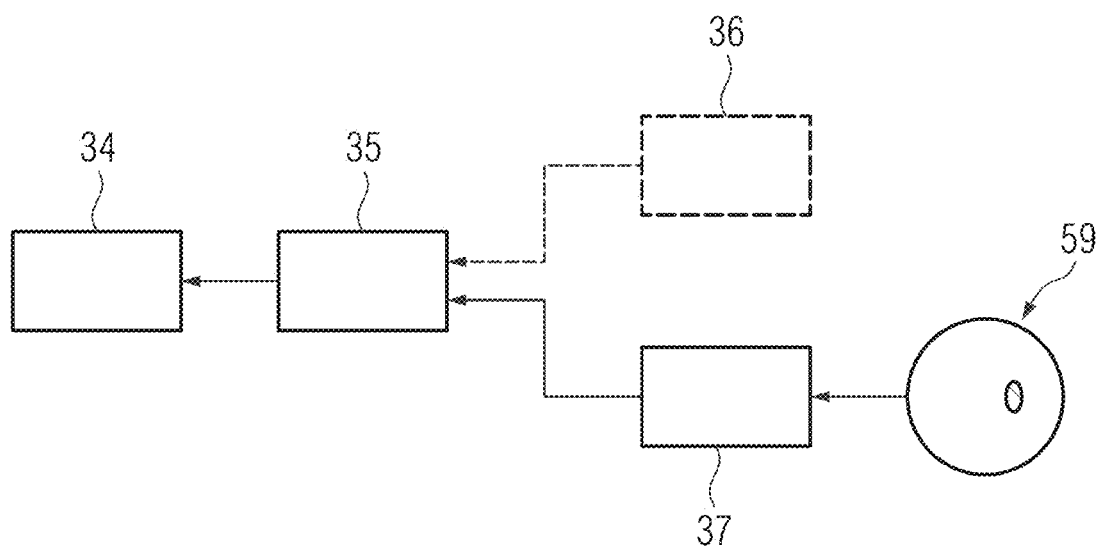
FIG. 8 illustrates a training scheme for a case of successful recanalization.

In FIG. 7, relating to a failed recanalization, only output training data 58 regarding the penumbra subfunction 36 is available, such that training and optimization regarding the core subfunction 37 is disabled, as indicated by the dashed representation. In FIG. 8, describing the case of successful recanalization procedure, output training data 59 is available only for the core subfunction 37, such that training and optimization for the penumbra subfunction 36 is disabled. The idea here is to guide the penumbra and core subfunctions 36, 37 to predict the specific lesion types, whereas the common predictor, that is subfunction 35, combines the information of the subfunction 34 and the perfusion parameter maps 39, such that both predictors benefit. Only the loss functions regarding penumbra 53 and core 52 are actively used here.

In the concrete illustration of step S5 in FIG. 5, training of the pretrained function 45 is performed batchwise, wherein the batches are compiled such that they comprise both cases of successful and failed recanalization procedures, in particular in an equal or at least essentially equal number. A batch containing only cases regarding to successful recanalization or failed recanalization might disturb regularization terms and momentum terms for the training of the subfunctions 34, 35, which is in this embodiment solved by using mixed, in particular stratified, batches, wherein the gradients which originate from the penumbra path and the gradient originating from the core path are summed up.

Once training on all training datasets 46, 47 has been performed, the training method provides the trained function 60 as its output.

Figure 9:
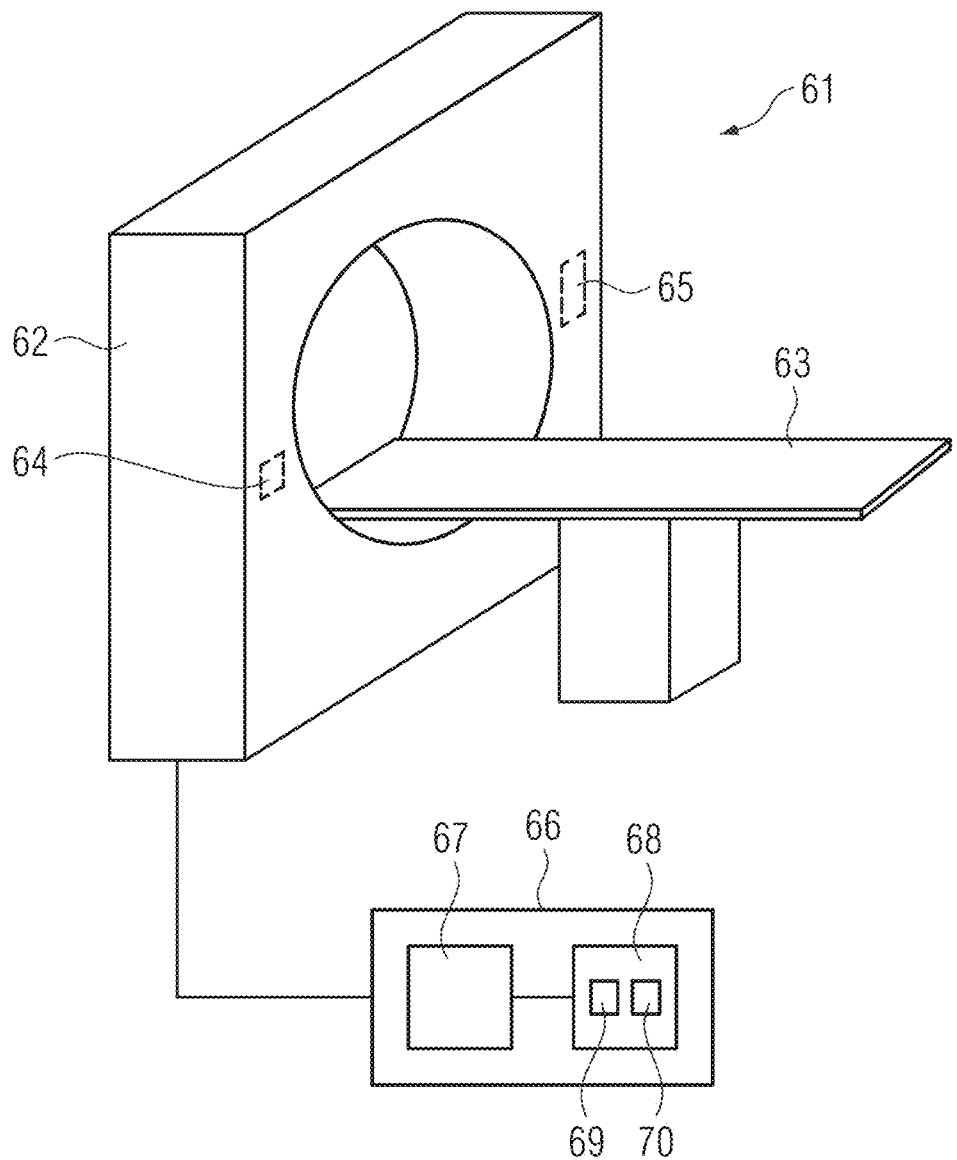
FIG. 9 illustrates a computed tomography imaging system according to an embodiment.

FIG. 9 is a schematical drawing of a computer tomography imaging system 61. The computer tomography imaging system 61 may, as known from the art, comprise a gantry 62 having a cylindrical opening for receiving a patient, in particular on a patient table 63. An acquisition arrangement comprising an X-ray source 64 and an X-ray detector 65 may be rotatably mounted inside a gantry 62 to provide projection images of the patient using different projection geometries, from which three-dimensional images may be reconstructed as principally known. The operation of the computer tomography imaging system 61 may be controlled by a control device 66, which may comprise an acquisition unit 67 controlling the acquisition of CT datasets, in particular the CTP dataset 38 according to step S1. The control device 66 further comprises an evaluation device 68 for evaluating CT data acquired in the computer tomography imaging system 61. In this embodiment, the evaluation device 68 comprises a determination unit 69 for deriving parameter maps 39 from a CTP dataset 38 according to step S2 as well as a segmentation system 70 according to embodiments of the present invention, in particular for deriving the segmentation information according to step S3.

Figure 10:
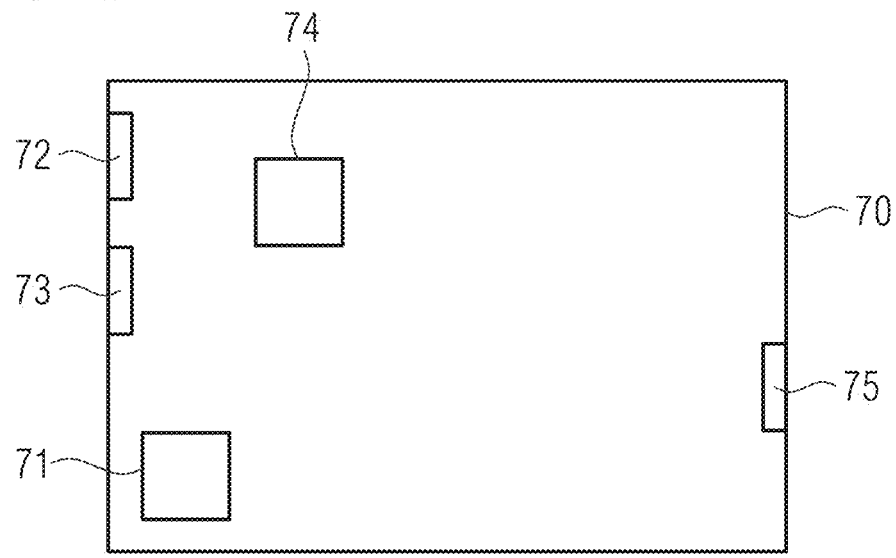
FIG. 10 illustrates the functional structure of a segmentation system according to an embodiment.

The functional structure of the segmentation system 70 is visualized in FIG. 10. The segmentation system 70 comprises at least one storage means 71, which may be comprised by at least a part of a storage means of the control device 66. In the storage means 71, among other data, the trained function 60 may be stored.

The segmentation system 70 comprises a first interface 72 for receiving the computed tomography perfusion dataset 38 and a second interface 73 for receiving the parameter maps 39. In a segmentation unit 74, segmentation according to step S3 in FIG. 3 is performed using the trained function 60. Via a third interface 75, the segmentation information 42 may be provided as the output data.

Figure 11:
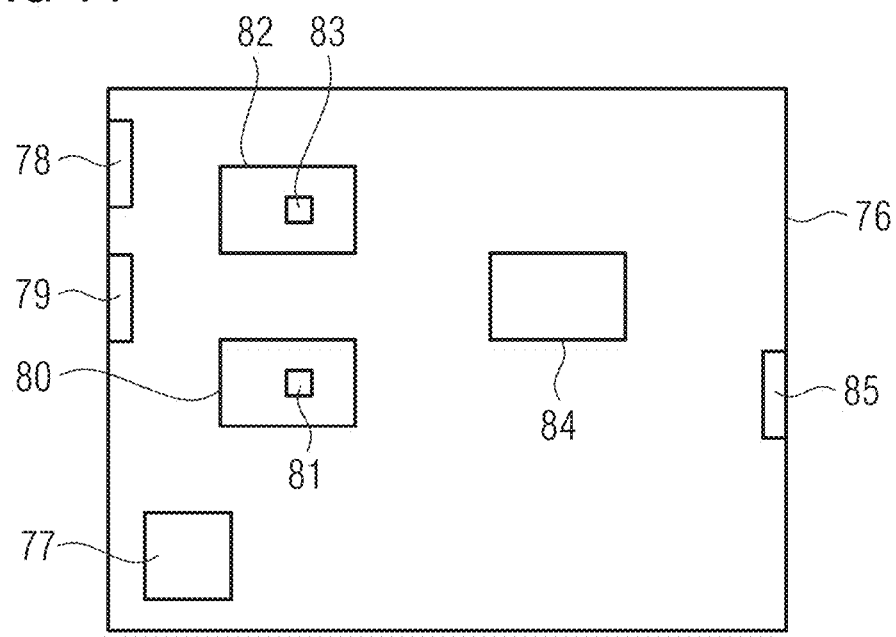
FIG. 11 illustrates the functional structure of a training system according to an embodiment.

FIG. 11 shows the functional structure of a training system 76 according to the current invention. The training system 76 also comprises a storage means 77, wherein, for example, pretraining and training data may be stored. Via a first training interface 78, training information is received. If pretraining is to be performed, corresponding pretraining information may be received via a third training interface 79. The pretraining information is used in a pretraining unit 80 for pretraining the function 43 according to step S4, while, to derive the pretraining dataset according to step S6, a thresholding subunit 81 is provided.

In a training dataset compilation unit 82, training datasets 46, 47 are determined from the training information, in particular the training information 48, using an output training data determination subunit 83 to perform step S7. Using these training datasets 46, 47 in a training unit 84, machine learning is performed according to step S5 to yield the trained function 60, which may be provided at a second training interface 85.

It is finally noted that the training system 76 may also be integrated with the segmentation system 70 and/or the control device 66.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module or interface may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices (i.e., storage means). The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been described in detail with reference to the preferred embodiment, the present invention is not limited by the disclosed examples from which the skilled person is able to derive other variations without departing from the scope of the present invention.

The invention claimed is:

1. A computer-implemented segmentation method for segmenting a core and a penumbra in a four-dimensional computed tomography perfusion (4D CTP) dataset of ischemic tissue in an image region of a patient, the computer-implemented segmentation method comprising:
   determining at least one parameter map for at least one perfusion parameter from the 4D CTP dataset; and
   using the at least one parameter map and the 4D CTP dataset as input data to a trained function to determine output data, the output data including segmentation information of the penumbra and the core, and the trained function being configured to determine the output data based on the input data.

2. The computer-implemented segmentation method according to claim 1, wherein the trained function comprises at least one subfunction.

3. The computer-implemented segmentation method according to claim 2, wherein
   the at least one subfunction includes a first subfunction and a second subfunction;
   the 4D CTP dataset is used as input data for the first subfunction for determining intermediate feature data; and
   the intermediate feature data is supplied with the at least one parameter map to at least one second subfunction for determining the output data.

4. The computer-implemented segmentation method according to claim 3, wherein
   the at least one subfunction includes,
      the first subfunction,
      the second subfunction, and
      separate and independent subfunctions; and
   intermediate data from the second subfunction is supplied to the separate and independent subfunctions to determine,
      first segmentation information relating to the penumbra or a combined region of the penumbra and the core, and
      second segmentation information relating only to the core.

5. The computer-implemented segmentation method according to claim 2, wherein
   the at least one subfunction includes,
      an upstream subfunction, and
      separate and independent subfunctions; and intermediate data from the upstream subfunction is supplied to the separate and independent subfunctions to determine,
- first segmentation information relating to the penumbra or a combined region of the penumbra and the core, and
- second segmentation information relating only to the core.

6. A non-transitory computer-readable medium storing a computer program that, when executed by a computing device, is configured to cause the computing device to perform the computer-implemented segmentation method of claim 1.

7. A non-transitory electronically readable storage medium including computer readable instructions that, when executed by a computing device, are configured to cause the computing device to perform the computer-implemented segmentation method of claim 1.

8. A computer-implemented training method for providing a trained function for segmenting a core and a penumbra in a four-dimensional computed tomography perfusion (4D CTP) dataset of ischemic tissue in an image region of a patient, the trained function being configured to use input data to determine output data, the input data including the 4D CTP dataset and at least one parameter map for at least one perfusion parameter, the at least one perfusion parameter being determined from the 4D CTP dataset, the output data including segmentation information of the penumbra and the core, and the computer-implemented training method comprising:
- determining training datasets including input training datasets and associated output training datasets, each respective output training dataset among the output training datasets being determined by,
  - receiving ground truth data including at least one binary success indicator and at least one follow-up examination dataset of at least a part of the image region, the at least one follow-up examination dataset being acquired after a recanalization procedure, and the at least one binary success indicator indicating whether the recanalization procedure was successful, and
  - determining the respective output training dataset by performing one of,
    - annotating all segmented ischemic tissue in the at least one follow-up examination dataset as core based on the at least one binary success indicator indicating the recanalization procedure was successful, or
    - annotating all segmented ischemic tissue in the at least one follow-up examination dataset as penumbra and core based on the at least one binary success indicator indicating the recanalization procedure was not successful; and
- training a function based on the training datasets to obtain the trained function, and
- providing the trained function.

9. The computer-implemented training method according to claim 8, wherein the at least one follow-up examination dataset includes a diffusion weighted imaging dataset, a further computed tomography perfusion dataset, or a non-contrast computed tomography dataset.

10. The computer-implemented training method according to claim 9, wherein
the trained function includes a penumbra subfunction and a core subfunction, the penumbra subfunction being configured to determine first segmentation information relating to the penumbra or combined region of the penumbra and the core, and the core subfunction being configured to determine second segmentation information relating only to the core; and
the training includes,
- disabling training of the core subfunction based on a first output training dataset among the output training datasets only including penumbra and first core segmentation information, and
- disabling training of the penumbra subfunction based on a second output training dataset among the output training datasets only including second core segmentation information.

11. The computer-implemented training method according to claim 9, further comprising:
pretraining the function based on pretraining data before the training is performed, the pretraining being based on output pretraining data, and the output pretraining data being determined using thresholding on the at least one parameter map to segment both the penumbra and the core.

12. The computer-implemented training method according to claim 8, wherein
the trained function includes a penumbra subfunction and a core subfunction, the penumbra subfunction being configured to determine first segmentation information relating to the penumbra or combined region of the penumbra and the core, and the core subfunction being configured to determine second segmentation information relating only to the core; and
the training includes,
- disabling training of the core subfunction based on a first output training dataset among the output training datasets only including penumbra and first core segmentation information, and
- disabling training of the penumbra subfunction based on a second output training dataset among the output training datasets only including second core segmentation information.

13. The computer-implemented training method according to claim 12, wherein the training includes training the function using batches of multiple training datasets among the training datasets, the batches being determined such that each of the batches contains a comparable number of training datasets based on a successful recanalization procedure and training datasets based on an unsuccessful recanalization procedure.

14. The computer-implemented training method according to claim 13, further comprising:
pretraining the function based on pretraining data before the training is performed, the pretraining being based on output pretraining data, and the output pretraining data being determined using thresholding on the at least one parameter map to segment both the penumbra and the core.

15. The computer-implemented training method according to claim 12, further comprising:
pretraining the function based on pretraining data before the training is performed, the pretraining being based on output pretraining data, and the output pretraining data being determined using thresholding on the at least one parameter map to segment both the penumbra and the core.

16. The computer-implemented training method according to claim 8, further comprising:
pretraining the function based on pretraining data before the training is performed, the pretraining being based on output pretraining data, and the output pretraining data being determined using thresholding on the at least one parameter map to segment both the penumbra and the core.

17. The computer-implemented training method according to claim 16, wherein the pretraining uses a first loss function for the penumbra, a second loss function for the core, and a third loss function based on a relationship between the penumbra and the core.

18. The computer-implemented training method according to claim 8, wherein at least one of the output training datasets is based on at least one of a diffusion weighted imaging dataset or a perfusion weighted imaging dataset acquired by a magnetic resonance device in at least a same state of the patient as the 4D CTP dataset.

19. A segmentation system for segmenting a core and a penumbra in a four-dimensional computed tomography perfusion (4D CTP) dataset of ischemic tissue in an image region of a patient, comprising:
- a first interface configured to receive the 4D CTP dataset;
- a second interface configured to receive at least one parameter map for at least one perfusion parameter determined from the 4D CTP dataset;
- a segmentation unit configured to apply a trained function to input data to generate output data, the input data including the at least one parameter map and the 4D CTP dataset, the output data including segmentation information of the penumbra and the core, and the trained function being configured to determine the output data based on the input data; and
- a third interface configured to provide the output data.

20. A training system for providing a trained function for segmenting a core and a penumbra in a four-dimensional computed tomography perfusion (4D CTP) dataset of ischemic tissue in an image region of a patient, the trained function being configured to use input data to determine output data, the input data including the 4D CTP dataset and at least one parameter map for at least one perfusion parameter determined from the 4D CTP dataset, the output data including segmentation information of the penumbra and the core, and the training system comprising:
- a first training interface configured to receive training information;
- processing circuitry configured to
  - determine training datasets comprising input training datasets and associated output training datasets,
  - evaluate ground truth data for each of the training datasets to determine the output training datasets, the ground truth data including at least one binary success indicator and at least one follow-up examination dataset of at least a part of the imaging region, the at least one follow-up examination dataset being acquired after a recanalization procedure, the at least one binary success indicator indicating whether the recanalization procedure was successful, the evaluation including,
    - annotating all segmented ischemic tissue in the at least one follow-up examination dataset as core based on the at least one binary success indicator indicating the recanalization procedure was successful, or
    - annotating all segmented ischemic tissue in the at least one follow-up examination dataset as penumbra and core based on the at least one binary success indicator indicating the recanalization procedure was not successful;
- a training unit configured to train a function based on the training datasets to obtain the trained function; and
- a second training interface configured to provide the trained function.

* * * * *